Nov. 6, 1956
T. A. HUBER
2,769,498
APPARATUS FOR SQUEEZE CEMENTING WELL PERFORATIONS
Filed July 26, 1954
2 Sheets—Sheet 2
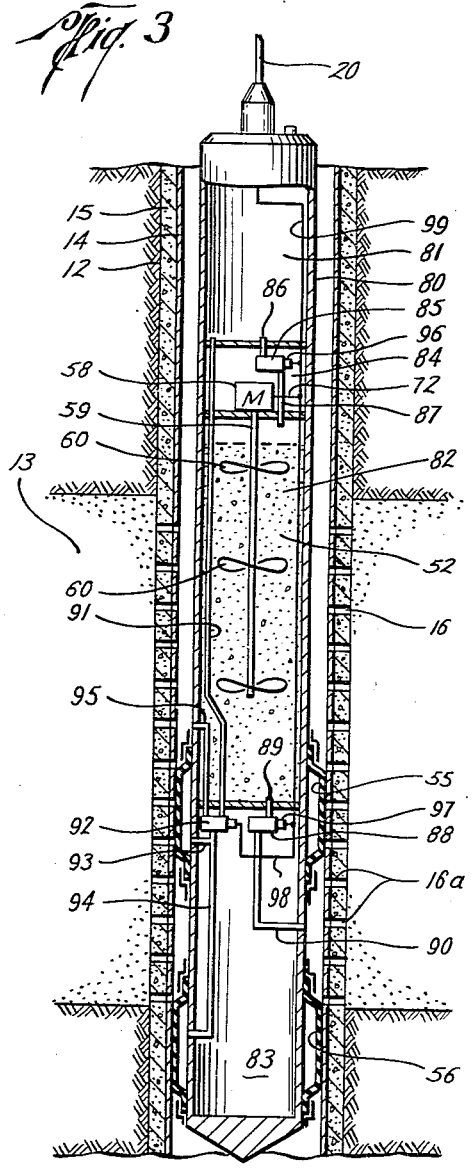
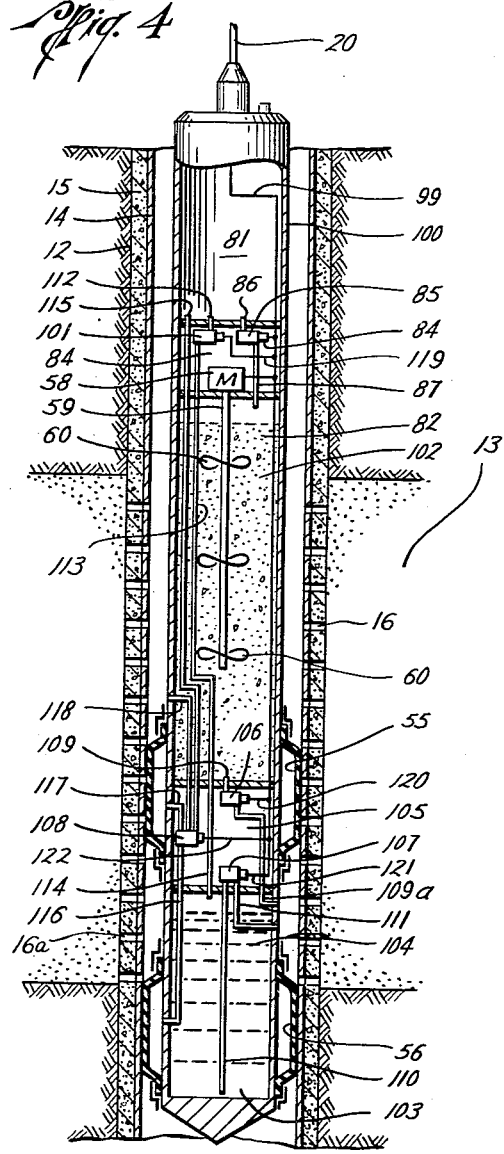
Theodore A. Huber
INVENTOR.
BY
ATTORNEY

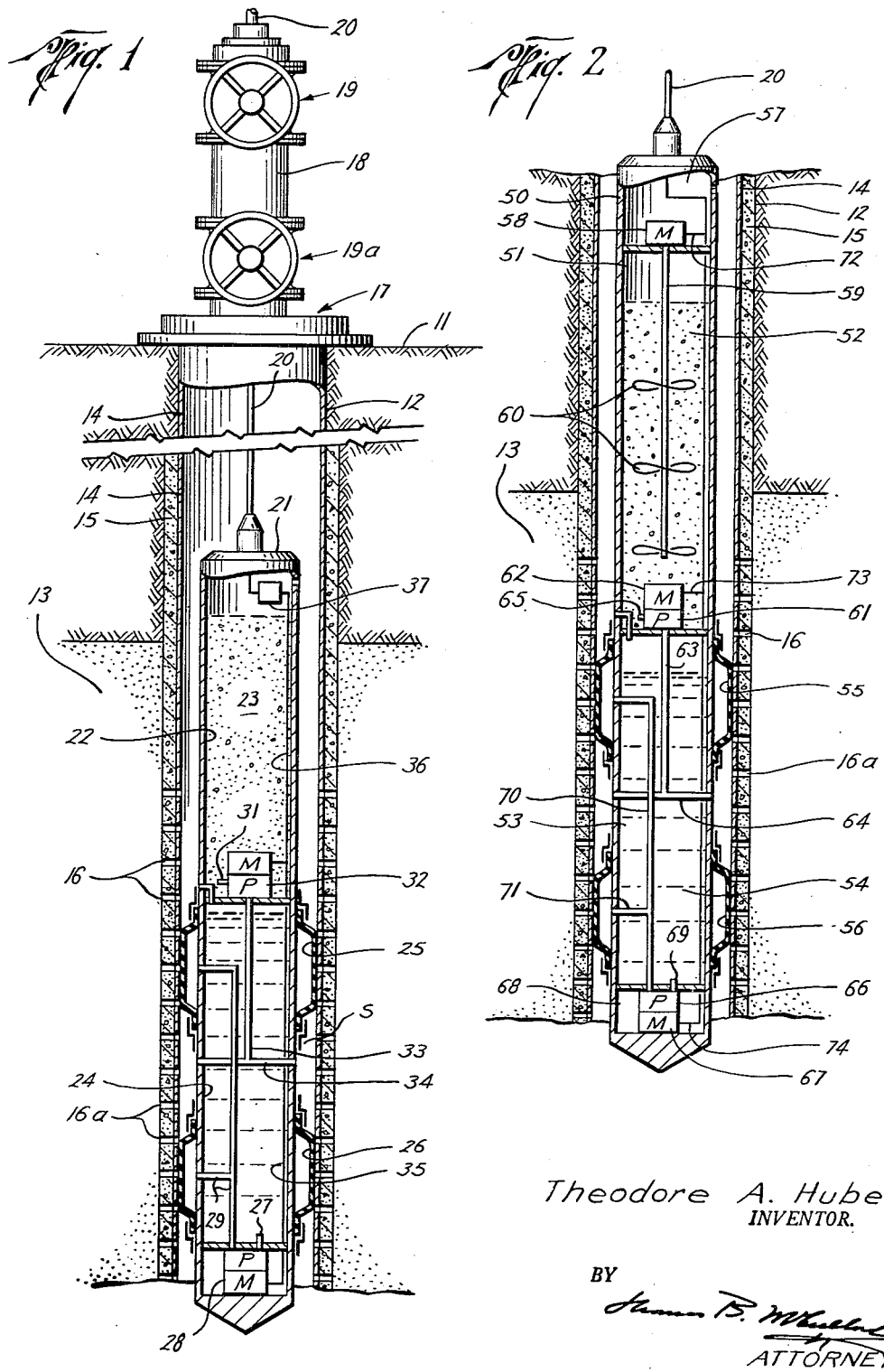

United States Patent Office 2,769,498
Patented Nov. 6, 1956

2,769,498

APPARATUS FOR SQUEEZE CEMENTING WELL PERFORATIONS

Theodore A. Huber, Houston, Tex., assignor, by mesne assignments, to Esso Research and Engineering Company, Elizabeth, N. J., a corporation of Delaware Application July 26, 1954, Serial No. 445,556

9 Claims. (Cl. 166—65)

The present invention is directed to method and apparatus for sealing selected intervals in a perforated casing. More particularly, the invention is concerned with method and apparatus for squeeze cementing in a perforated casing without killing the well. In its more specific aspects, the invention is directed to a method and apparatus for working over perforated wells.

The present invention may be briefly described as a method for sealing off selected perforations in a perforated well casing which comprises isolating the perforations and then spotting a body of fluid cement in a small volume adjacent the isolated perforations. Pressure is then exerted on the body of cement to force a portion of the cement into and seal the isolated perforations. Thereafter any excess cement in the casing is wiped from the sealed perforations.

In the practice of the present invention the outside pressure differential exerted on the body of cement in excess of that equivalent to the fluid column and above the foramtion pressure is substantially less than 1 pound per foot of depth to the isolated perforations and preferably ranging upwardly to 500 pounds and the body of cement may have a volume slightly in excess of the volume required to fill the perforations and the space between packers isolating the perforations.

The invention comprises apparatus for sealing off selected intervals in a perforated casing which comprises an elongated body member adapted to be lowered in the casing and which is provided with a first chamber adapted to receive a body of fluid cementitious material, such as Portland cement, and such as those with controlled setting or controlled settling time, as exemplified by the Salthiel Patent, 2,582,459, and other cements and plastics of similar characteristics, and the like. A plurality of spaced apart deformable packing members are arranged on said body to isolate, when inflated, selected intervals or a selected interval in the perforated casing. The body is provided with a second chamber which is adapted to receive a body of fluid, such as a hydraulic liquid. A first conduit means fluidly communicates the first chamber with the outer surface of the body member between the spaced apart packing members and a second conduit fluidly communicates the second chamber with the space enclosed by the packing members. Arranged in the body member is a first pumping or pressure injection means which is fluidly connected to the first conduit for pumping or injecting fluid cement between the packing members and a second pumping or injection means is also arranged in the body member for pumping or injecting the hydraulic fluid into the packing members to inflate the packing members and isolate a selected interval in the perforated casing.

The invention will be further illustrated by reference to the drawing in which

Fig. 1 is a sectional view of one embodiment illustrating the invention;

Fig. 2 is a sectional view illustrating a modification of the device of Fig. 1;

Fig. 3 is a further modification of the present invention; and

Fig. 4 is a modification of Fig. 3 in which a two-phase cement is employed.

Referring now to the drawing, in which identical numerals will designate identical parts, in Fig. 1 numeral 11 illustrates the surface of the earth in which a well 12 has been drilled to penetrate a hydrocarbon productive interval or zone 13. Arranged in the well 12 is a well casing 14 which has been cemented in place with cement 15. The well casing 14 and cement 15 have been perforated in the hydrocarbon productive interval 13 to form perforations 16 to allow fluid to be produced from the interval 13. The well casing is provided with conventional wellhead equipment 17 and a suitable lubricator 18 which, in turn, is provided with valves 19 and 19a.

Suspended from means not shown, such as a service truck on electrical conductor cable 20, is an elonagted body member 21 which is provided with a first chamber 22 adapted to receive a body of fluid cement 23. The eiongated body member 21 encloses a second chamber 24 which is adapted to receive a hydraulic fluid, such as an oily or aqueous medium, such as salt water and the like. The elongated body member has arranged on an exterior surface a plurality of spaced apart packing members 25 and 26 which are suitably constructed of deformable material, such as synthetic or natural rubber, which may be suitably internally reinforced, for sealing off as will be described.

Arranged in the body member 21 and in fluid communication with the chamber 24 by means of a conduit 27 is a pumping means 28 which fluidly communicates with the interior of the spaced apart packers 25 and 26 by means of a conduit 29 which allows the hydraulic fluid to be pumped into the spaces enclosed by the spaced apart packing members 25 and 26.

Arranged in the body member 21 and in fluid communication with the chamber 22 by means of a conduit 31 is a second pumping means 32 which is fluidly connected to a conduit 33 which, in turn, communicates with the lateral conduit 34 which discharges between the spaced apart packing members 25 and 26. The pumping means 28 and 32 are electrically connected to the earth's surface through electrical connecting means 35 and 36 which are electrically connected to the electrical conductor cable 20 and which, in turn, communicates with a source of electrical energy, not shown.

The electrical conductor cable may have two circuits or a single circuit and if a single circuit is employed a current selector 37 is provided.

Referring now to Fig. 2, numeral 50 designates an elongated body member which is lowered on an electrical conductor cable 20 to a position adjacent the perforations 16a in the formation or interval 13 which are to be sealed. The elongated body member 50 is provided with a first chamber 51 in which is arranged a slurry of cement 52 and a second chamber 53 which contains a hydraulic fluid 54, such as oil or salt water or aqueous medium and the like.

The elongated body member 50 is provided with spaced apart deformable packing members 55 and 56. Arranged in a compartment 57 above the chamber 51 is an electric motor 58 to which is connected a shaft 59 which extends into the chamber 51 and serves to agitate the slurry 52 by means of propellers 60 arranged on the shaft 59.

It is to be understood, of course, that the embodiment of Fig. 1 may be provided with agitation means and the like for the cement slurry, similar to that of Fig. 2.

The pump 61 is arranged in a chamber 51 and is provided with an electric motor 62 and serves to distribute cement between the packers 55 and 56 by means of a conduit 63 connected to a lateral conduit 64 which opens on the exterior of the body member 50 between the packers 55 and 56. Suction is taken by the pump 61 on the cement slurry 52 through conduit 65.

The deformable packing members 55 and 56 are inflated or collapsed by means of pump 66 which is provided with an electric motor 67, the pump 66 and motor 67 being arranged in compartment 68 in the lower end of the body member 50. The pump 66 takes suction on the hydraulic fluid 54 through conduit 69 and distributes same to the packers 55 and 56 through conduits 70 and 71.

The motors 58, 62, and 67 receive energy through electrical connecting means 72, 73, and 74 which are carried to the earth's surface through electrical conductor cable 20.

In Fig. 3 a modification of my invention is presented in which an elongated body member 80 is lowered into the well on electrical conductor cable 20. In this embodiment of the invention a gas chamber 81 is provided filled with gas under pressure. The gas may suitably be hydrocarbons, such as methane, and other gases, such as carbon dioxide, nitrogen and the like. Below the chamber 81 is a second chamber 82 which contains a slurry of cement 52 and below the chamber 82 is a compartment 83 in which is arranged valves for control of the apparatus as will be described. Arranged on the exterior surface of the body member 80 are spaced apart packing members 55 and 56 like in Fig. 2.

Between the gas chamber 81 and the cement reservoir 82 is a compartment 84 in which a motor 58 is provided to which is connected a shaft 59 on which is arranged agitators or propellers 60 for agitating the cement slurry 52.

The compartment 84 has a solenoid or motor valve 85 arranged therein which communicates by conduit 86 to the gas chamber 81 and by conduit 87 to the cement reservoir 82.

Arranged in the compartment 83 is a solenoid or motor valve 88 which communicates by conduit 89 with the cement 52 in reservoir 82 and by conduit 90 to the space between the packers 55 and 56.

The gas reservoir or chamber 81 communicates by conduit 91 with a solenoid or motor valve 92 in the compartment 83. This solenoid or motor valve also communicates by conduits 93 and 94 with the packing members 55 and 56, respectively.

Still another conduit 95 communicates the solenoid or motor valve 92 with the surface of the body member 80.

The electric motor 58 receives energy by electrical connecting means 72 while the solenoid or motor valves 85, 88 and 92 receive energy through electrical connecting means 96, 97 and 98. The several electrical connections 72, 96, 97 and 98 are carried to the earth's surface by a common electrical connection 99 which leads into electrical conductor cable 20.

Referring now to Fig. 4, an elongated body member 100 is provided with a gas reservoir 81, like in Fig. 3, and has a compartment 84 in which is arranged a motor 58 and solenoid or motor valves 85 and 10. The solenoid or motor valve 85 communicates the gas chamber 81 through conduits 86 and 87 with a cement reservoir 82. Arranged in the cement reservoir 82 is a cement slurry, such as 102, which may be a kerosene-cement slurry which is free of water.

The motor 58 is provided with shaft 59 on which is arranged propellers 60 which serve to agitate the slurry 102.

The lower portion of the body member 100 is provided with a water reservoir 103 in which is arranged a body of water 104.

Between the water reservoir 103 and the cement reservoir 82 is a valve compartment 105 which houses solenoid or motor valves 106, 107 and 108, respectively.

The exterior surface of the body member 100 on its lower end is provided with deformable packing members 55 and 56 as in Figs. 2 to 3.

The solenoid valve 106 communicates with the cement reservoir 82 by lines 109 and 109a which serve to deliver the cement slurry between the packers 55 and 56. The water reservoir 103 also communicates with the space between the packers 55 and 56 through solenoid valve 107 by conduits 110 and 111.

The gas reservoir 81 is in communication with the water reservoir 103 through solenoid valve 101 by means of conduits 112 and 113.

The gas reservoir 81 also communicates with the solenoid valve 108 through conduit 114.

The solenoid valve 108 is also provided with conduits 116 and 117 for inflating the deformable packing members 55 and 56. Yet another conduit 118 connects the solenoid valve 108 with the exterior surface of the body member 100.

The solenoid valve 85 is connected to a common electrical connecting means 99 for electrical lead 84 while the solenoid 101 also connects therewith by electrical connecting means 119. The solenoid valves 106, 107 and 108 also connect to the common electrical connecting means 99 by means of electrical connections 120, 121 and 122.

In practicing the present invention, pressure is equalized within the cement and hydraulic fluid chambers with pressures outside the several modifications of the tool. With reference to Fig. 1, the carrier body or elongated member 21 is run into the well casing 14 on the electrical conductor cable 20 and is provided with a cement 23 in the chamber 22 and hydraulic fluid in the chamber 24. The elongated member 21 is lowered to a level in the well where it is desirable to seal off selected perforations 16a through which water invasion has been occurring in the well from the interval 13 or gas invasion if the perforations to be sealed are in the upper part of the zone. The packers 25 and 26 are arranged to straddle the perforations 16a and by energizing the electrically operated pump 28 hydraulic fluid is pumped into the space enclosed by the inflatable packers 25 and 26 to isolate the perforations 16a. As soon as the perforations 16a have been isolated, the electrically operated pump 32 is energized to pump cement into the space S enclosed by the deformable packing members 25 and 26 to fill the perforations 16a and allow pressure to be imposed on the cement which is forced into perforations 16a to seal these perforations.

The amount of pressure imposed on the sealed perforations 16a to squeeze off the water (on water invasion) should be a relatively low pressure and should be less than that required to break down the formation or interval 13. Stating this otherwise, the total pressure should be substantially less than 1 pound per foot of depth in the well to the isolated perforations 16a in the formation 13 and preferably a pressure differential less than 500 pounds above the pressure existing in the formation.

The amount of cement provided in the chamber 23 should be sufficient to fill the conduits 33 and 34, the space S and the perforations 16a. Thus the ratio of the cement reservoir 23 to the sum of the volumes of the conduits 33 and 34, the space S and the volume of the perforations 16a may be at least 1 and may be as great as 1.5 times the aggregate volumes of the spaces the cement must fill. The volume of the perforations may be only about 5 to about 25 percent of the total volume of space filled by the cement.

After the perforations have been sealed by imposition of pressure, the deformable packing members 25 and 26 may be collapsed by reversing the pump 23 to collapse at least partially the packing members 25 and 26. The elongated body member is then elevated a few feet above the cement interval or perforations 16a and then the packing members 25 and 26 are partially inflated and the elongated member lowered back through the region of the perforations 16a to wipe off or disengage any excess cement remaining in the casing adjacent the sealed perforations 16a. The same dislodging or wiping operation may be performed by deflating the packing members 25 and 26, lowering the elongated member 21, partially inflating the packing members 25 and 26 and raising the elongated member 21 to provide the wiping action.

As stated heretofore, the electrical energy required to conduct the operation may be supplied through the conductor cable 20 and may utilize two circuits or a single circuit. When a single circuit is employed, a current selector, such as 37, would be provided.

The apparatus of Fig. 2 operates somewhat similarly to that of Fig. 1 in that the body member 50 would be lowered adjacent the region of the perforations 16a which are to be sealed. The deformable packing members 55 and 56 would be inflated by energizing the pump 66 through the motor 68 to cause hydraulic fluid to be pumped through conduits 70 and 71 to inflate the packers 55 and 56.

Thereafter the motor 62 would energize the pump 61 and deliver cement through the conduits 63 and 64 between the packers 55 and 56 under pressure to squeeze cement into the perforations 16a between the packers. After the cement has been squeezed into the perforations 16a, the packers 55 and 56 may be deflated at least partially to allow the body member 50 to be lowered or raised, as has been described with respect to Fig. 1, and then re-inflated at least partially to wipe excess cement from the sealed interval as has been described. Thereafter production may be had from the perforations 16, the water encroachment through perforations 16a having been eliminated or any other undesirable perforations may have been sealed, depending on the location of packers.

During the lowering of the member 50, the motor 58 may be energized to keep the cement slurry 52 in a mixed condition.

The device of Fig. 3 operates in a similar fashion excepting that gas pressure is employed to inflate the packers 55 and 56 and to force the cement into the perforations 16a to seal same.

In operating the device of Fig. 3, the packers 55 and 56 are inflated by gas pressure delivered through solenoid or motor valve 92 by means of conduits 91, 93 and 94 on energizing the solenoid valve through electrical connecting means 98.

After the packers 55 and 56 of Fig. 3 have been inflated, the solenoid valve 85 is energized and gas pressure exerted through conduits 86 and 87 on the cement slurry 52 in cement reservoir 82. The solenoid valve 88 is energized through electrical connecting means 97 and the cement slurry is delivered between the packers 55 and 56 through conduits 89 and 90. By virtue of the pressure on the cement slurry 52, the cement is squeezed into the perforations 16a and the perforations 16a sealed off. Thereafter the packers 55 and 56 may be deflated by again energizing the solenoid valve 92 and allowing the gas in the packers 55 and 56 to be released through conduit 95. The body member 89 may then be lowered or raised and the packers 55 and 56 reinflated at least partially to wipe the excess cement from the sealed perforations 16a.

In the device of Fig. 4, gas pressure is also employed to inflate the packers 55 and 56. In this instance, however, an oil-cement slurry, such as one made up with kerosene or other similar hydrocarbons, is provided as a slurry 102 in the reservoir 82. This slurry is then kept in a mixed condition by the propellers 60 operated throught shaft 59 by motor 58. After the packers 55 and 56 have been set, as has been described with respect to Figs. 2 and 3, the cement slurry 102 has pressure imposed on it by opening solenoid valve 85 and allowing pressure to be imposed thereon through conduits 86 and 87. Thereafter, the solenoid valve 106 is energized and cement slurry is delivered in the space between packers 55 and 56 through conduits 109 and 109a. After the desired amount of cement slurry has been placed adjacent the perforations 16a, the solenoid valve 107 is then energized and water is delivered through the solenoid valve 107 by way of conduits 110 and 111 to displace the oil in the cement slurry 102 between the packers 55 and 56 and allow the cement slurry to set up and cement and seal the perforations 16a. After the perforations 16a have been suitably sealed, the packers 55 and 56 are suitably deflated at least partially by energizing valve 108 and releasing the gas by way of conduit 118. Thereafter the packers 55 and 56 may be partially re-inflated and the body member 100 moved upwardly or downwardly in the casing 14 to wipe residual cement from the sealed perforations 16a.

When an oil-cement slurry is employed, it may sometimes be necessary, because of the setting characteristics of these types of cement, to wipe the sealed perforations before instroducing water and thereby avoid flash setting of the cement as knobs on the interior of the casing. In some cases, it may be desirable to conduct the cementing operation with two strips in which the cement would be first placed adjacent the perforations to be sealed and then water would be squeezed into the cement by resetting the packers. The latter instance would be conducted in a favorable environment where the bottom of the well might contain oil or other similar neutral fluid material. In the latter case, it might be possible to use simpler equipment in that only one of the reservoir chambers may be employed with the same chamber being used for cement and water in sequence.

The total pressures employed in the improved squeeze cementing are substantially less than the 1 pound per foot of depth of the well which is usually employed in conventional cementing operations and preferably is in the range up to 500 pounds differential. Pressures as high as, but not exceeding, about 500 pounds over and above the formation pressure may be used and pressures as low as 10 pounds may be employed.

The cement used in the present invention is of the modified type such as described in the Salathiel patent supra or it may be a cement slurry made up with oil to which water is added during the cementing operation as has been described. The method also anticipates that plastics, filler plastics, and other cementitious materials may be employed, either in single application or in multiphase application (as described for Fig. 4).

The present invention is of considerable advantage in selectively sealing off perforations in wells completed without tubing and permits going into the well while the well is alive or under pressure. Thus cement may be placed selectively in a manner to seal off only one or a few of the perforations producing undesirable well fluids. The cement may be placed under relatively low pressure and the casing is left clear of undesirable cement obstructions. The well may be continued on production without requiring reperforation.

The apparatus of the present invention may be lubricated into a well under pressure as has been described without killing the well and without introducing undesirable contaminants into the formation. Also it is possible in the present invention to continue producion during the work-over operations.

It is noteworthy that the apparatus of the present invention is controlled from the surface both with respect to locating the interval to be squeezed off and controlling the squeezing operation or manipulation of the tool, such as inflating the packer and squeezing the cement.

As pointed out, only a relatively small volume of cement is used and only that volume necessary to seal the perforations and fill the space immediately adjacent the cementing area.

While the packers have been described as either hydraulic or pneumatic, it is to be understood that other packing means may be used which may be set by mechanical operation, such as telescoping of a sleeve on a mandrel.

Where tubing is employed in the well and set, the same ends may be accomplished with the exception that the well may have to be killed or brought under pressure control by running a packer or obstruction means out through the bottom of the tubing and setting such obstruction in the casing.

The present invention has particular applicability where there is a water-oil contact or a gas-oil contact. In these instances, water and/or gas invasion may be undesirable and the present invention allows sealing perforations through which the undesirable fluid may be produced without disturbing other perforations. The present invention eliminates the high cost of killing a well when a perforated completion is used and obviates running pipe into the hole with cementing packers for high pressure cementing and the necessity for reperforating when selectivity is not practiced. In addition, the present invention is advantageous in that mud and cement under high pressure are not introduced into contact with the formation since introduction of mud and/or cement under high pressure in contact with a producing formation is undesirable because of the damaging effect which may be caused to the permeability and porosity of the producing formation or interval.

It will be seen from the foregoing description that the present invention has numerous advantages and great utility in workover and completion operations.

The nature and objects of the present invention having been completely described and illustrated, what I wish to claim as new and useful and to secure by Letters Patent is:

1. Apparatus for sealing off a selected interval in a perforated casing which comprises a body member adapted to be lowered on a wireline in the casing provided with a first chamber containing a releasable slurry of fluid cementitious material and a second chamber containing a releasable body of fluid, spaced apart packing members arranged on said body to isolate when inflated at least one selected perforation in said perforated casing, means fluidly communicating said first chamber with the outer surface of said body member between said spaced apart packing members, means fluidly communicating said second chamber with the interior of said packing members, and separate means for introducing said fluid cement between said packing members and introducing said fluid into said packing members to inflate said packing members and isolate a selected interval in said perforated casing.

2. Apparatus for sealing off a selected interval in a perforated casing which comprises an elongated body member adapted to be lowered on a wireline in the casing provided with a first chamber containing a releasable slurry of fluid cementitious material and a second chamber containing a releasable body of fluid, spaced apart deformable packing members arranged on said body to isolate when inflated at least one selected perforation in said perforated casing, a first conduit fluidly communicating said first chamber with the outer surface of said body member between said spaced apart packing members, a second conduit fluidly communicating said second chamber with the interior of said packing members, a first injection means fluidly connected to said first conduit for injecting said fluid cement between said packing members and a second injection means fluidly connected to said second conduit for injecting said fluid into said packing members to inflate said packing members and isolate a selected interval in said perforated casing.

3. Apparatus for sealing off a selected interval in a perforated casing which comprises an elongated body member adapted to be lowered in the casing provided with a first chamber containing a releasable body of fluid cementitious material and a second chamber containing a releasable body of hydraulic fluid, a plurality of spaced apart deformable packing members arranged on said body to isolate when inflated a selected interval in said perforated casing, a first conduit fluidly communicating said first chamber with the outer surface of said body member between said spaced apart packing members, a second conduit fluidly communicating said second chamber with the interior of said packing members, a first pumping means fluidly connected to said first conduit for pumping said fluid cement between said packing members, a second pumping means fluidly connected to said second conduit for pumping said hydraulic fluid into said packing members to inflate said packing members and isolate selected perforations in the perforated interval in the casing, and wireline means attached to said body member for lowering and raising said body member in said casing.

4. Apparatus in accordance with claim 3 in which the first and second pumping means are electrically operated and the lowering and raising means is an electric conductor cable.

5. Apparatus in accordance with claim 4 in which the chamber has a volume at least equivalent to the volume of the first conduit plus the volume of the space enclosed by the inflated packing members plus the volume of the isolated perforations.

6. Apparatus for sealing off a selective interval in a perforated casing which comprises an elongated body member adapted to be lowered in the casing on a wireline provided with a first chamber containing a releasable slurry of fluid cementitious material and a second chamber containing a releasable body of fluid, spaced apart deformable packing members arranged on said body to isolate when inflated a selected interval in said perforated casing, a first conduit fluidly communicating said first chamber with the outer surface of said body member between said spaced apart packing members, a second conduit fluidly communicating said second chamber with the interior of said packing members, a first injection means fluidly connected to said first conduit for injecting said fluid cement between said packing members, a second injection means fluidly connected to said second conduit for injecting said fluid into said packing members to inflate said packing members and isolate a selected interval in said perforated casing, and means arranged in said first chamber for agitating said slurry of fluid cementitious material.

7. Apparatus in accordance with claim 6 in which the first and second injection means are controlled by electrically operated valves.

8. Apparatus in accordance with claim 6 in which the first and second injection means are electrically operated pumps.

9. Apparatus in accordance with claim 6 in which the body member is provided with a third chamber containing a releasable body of water for injecting into the fluid cementitious material between said spaced apart packing members.

References Cited in the file of this patent

UNITED STATES PATENTS

| | | |
|---|---|---|
| 2,290,141 | Burt | July 14, 1942 |
| 2,347,729 | Benz | May 2, 1944 |
| 2,381,929 | Schlumberger | Aug. 14, 1945 |
| 2,696,259 | Greene | Dec. 7, 1954 |